(12) United States Patent
Clark

(10) Patent No.: US 9,575,774 B2
(45) Date of Patent: Feb. 21, 2017

(54) LINKING VIRTUALIZED APPLICATION NAMESPACES AT RUNTIME

(75) Inventor: Jonathan Clark, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 1254 days.

(21) Appl. No.: 12/429,472

(22) Filed: Apr. 24, 2009

(65) Prior Publication Data

US 2009/0271787 A1    Oct. 29, 2009

Related U.S. Application Data

(60) Provisional application No. 61/047,927, filed on Apr. 25, 2008.

(51) Int. Cl.
*G06F 17/30* (2006.01)
*G06F 9/44* (2006.01)
*G06F 9/445* (2006.01)
*G06F 9/455* (2006.01)

(52) U.S. Cl.
CPC ............... *G06F 9/445* (2013.01); *G06F 9/455* (2013.01); *G06F 17/30174* (2013.01)

(58) Field of Classification Search
CPC .... G06F 9/445; G06F 9/455; G06F 17/30174; G06F 8/65
See application file for complete search history.

(56) References Cited

U.S. PATENT DOCUMENTS

| | | | | |
|---|---|---|---|---|
| 5,721,824 A * | 2/1998 | Taylor | ............................ | 709/203 |
| 6,848,106 B1 * | 1/2005 | Hipp | ............................ | 719/312 |
| 6,931,548 B2 * | 8/2005 | O'Connor | ............. | G06F 21/126 |
| | | | | 726/22 |
| 6,961,806 B1 | 11/2005 | Agesen et al. | | |
| 7,756,821 B2 * | 7/2010 | Havens et al. | ................ | 707/600 |
| 7,831,578 B2 * | 11/2010 | Chuang et al. | ............... | 707/705 |
| 7,886,301 B2 * | 2/2011 | Sheehan | ....................... | 718/104 |

(Continued)

OTHER PUBLICATIONS

Yang Yu et al., "A Feather-weight Virtual Machine for Windows Applications", Second International Conference on Virtual Execution Environments (VEE '06), Ottawa, Ontario, Canada, Jun. 14-16, 2006, Usenix Association, Jun. 14, 2006, pp. 24-34.

(Continued)

*Primary Examiner* — Shew-Fen Lin

(57) ABSTRACT

A method for linking a plurality of virtualized application packages for execution on a computer system is described. A runtime executable of a primary virtualized application package is launched. A secondary virtualized application package to be merged with the primary virtualized application package is identified. In one embodiment, application settings and file data for the first and second virtualized application packages are merged into a single data structure. An execution layer is created by starting execution of one of the application files associated with the primary virtualized application package. Requests from the execution layer to the operating system for configuration settings and contents of application files of either the primary virtualized application package or secondary virtualized application package and providing requested configuration settings are satisfied using configuration settings and file information from both the primary and secondary virtualized application packages.

23 Claims, 4 Drawing Sheets

(56) References Cited

U.S. PATENT DOCUMENTS

| | | | |
|---|---|---|---|
| 2002/0099951 A1* | 7/2002 | O'Connor | G06F 21/126 |
| | | | 726/26 |
| 2005/0044162 A1* | 2/2005 | Liang et al. | 709/212 |
| 2005/0060722 A1 | 3/2005 | Rochette et al. | |
| 2005/0251503 A1* | 11/2005 | McCauley et al. | 707/2 |
| 2007/0136282 A1* | 6/2007 | Takashima | 707/6 |
| 2007/0220021 A1* | 9/2007 | Kato et al. | 707/100 |
| 2008/0010630 A1* | 1/2008 | Ou-Yang et al. | 717/121 |
| 2008/0034071 A1* | 2/2008 | Wilkinson et al. | 709/220 |
| 2009/0133013 A1* | 5/2009 | Criddle | G06F 8/60 |
| | | | 717/174 |
| 2009/0249051 A1* | 10/2009 | TeNgaio et al. | 713/1 |

OTHER PUBLICATIONS

Stephen Soltesz et al., "Container-based Operating system Virtualization: A Scalable, High-performance Alternative to Hypervisors", EuroSys '07, Mar. 21-23, 2007, Lisboa, Portugal, pp. 275-287.

Angelo Gaeta et al., "Design patterns for Secure Virtual Organization Management Architecture", Security and Privacy in Communications Networks and the Workshops, 2007. Third International Conference on, IEEE, Piscataway, New Jersey, Sep. 17, 2007, pp. 207-216.

International Search Report (Jul. 15, 2009), International Application Number: PCT/US2009/041640, 14 pages.

\* cited by examiner

LINKING VIRTUALIZED APPLICATION NAMESPACES AT RUNTIME

CROSS REFERENCE TO RELATED APPLICATIONS

This application claims benefit of earlier-filed U.S. Provisional Patent Application 61/047,927, filed Apr. 25, 2008 and entitled, "Linking Virtualized Application Namespaces at Runtime," and which is incorporated herein by reference.

BACKGROUND

Modern computer applications, such as document creation programs, Internet applications, and so forth, require a large number of files and system settings to function properly. The term, "application" is to be interpreted broadly to include, for example and without limitation, a stand-alone application, which may be associated with a plurality of files and system settings; a run-time library, such as Microsoft's DirectX® package, Sun Microsystem's Java run-time library, etc.; or a plug-in or extension, such as Adobe Flash® browser plug-in, Adobe Reader®, etc. In general, any file or group of files and/or system settings may, for present purposes, be considered an "application."

FIG. 1 shows exemplary computer system 10 having an application installed thereon. Computer system 10 includes one or more data buses 18 interconnecting one or more central processor units (CPUs) 12, a user interface 14, network interface 16, and memory system 20. User interface 14 may, for example, comprise a keyboard, mouse inputs, audio and video outputs, etc. (not shown). Memory system 20 may comprise a plurality of memories (not shown) for storing data and instructions for execution on CPU(s) 12. Each memory may include a machine readable medium. The memories making up memory system 20 may include, for example, volatile and non-volatile memories and caches. Memory system 20 may additionally include remote memory (not shown), e.g., memory or file systems accessible via network interface 16 or through an additional in/out (I/O) interface or bus (not shown). Those skilled in the art will recognize that FIG. 1 is a simplified diagram of computer system 10, and that a typical computer system will include many additional components and subcomponents not represented herein for the purpose of brevity.

In the present example, memory system 20 stores executable application file 22, which is a file containing computer instructions causing the computer to perform functions according to the purpose of the application. In addition, memory 20 may include ancillary files 24 which may contain data or additional executable code. Ancillary files 24 may be installed onto memory system 20 according to an installation program or script (not shown) at the time application executable 22 is installed. Memory system 20 also includes shared files 26. Shared files 26 may be pre-existing, i.e., already present on the system prior to the installation of application executable 22, or they may be installed at the time application executable 22 is installed. A distinction between shared files 26 and ancillary files 24 is that shared files 26 are registered with the operating system and/or located in memory system 20 such that other applications (not shown) can access and utilize the shared files. In the example of FIG. 1, shared files 26 include one or more dynamically linked library (DLL) files 28. Finally, an operating system (OS) 28 is present on memory system 20. The operating system includes files containing system settings 30. In the Microsoft Windows® operating system, the system settings are referred to as "registry settings" and are stored in a data tree structure formed by several files. When the application is installed, system settings may be created and stored along with system settings for the operating system as well as for other, previously-installed applications.

It is not uncommon for the installation of a single application to include the copying of hundreds of individual data files, code libraries, and system settings, along with one or more executable program files. Furthermore, files may be copied to disparate locations within a logical structure of the file system, referred to herein as a "directory." The directory is made up of numerous folders logically organized in a hierarchical structure. When installing an application, some files may be copied to a main installation folder (e.g., "c:\Windows\Program Files\Application" in Windows) whereas other files may be copied to system folders, "common" folders, user folders, or folders subordinate to the main installation folder.

To further complicate application installations, many applications today have numerous dependencies on pre-installed applications, shared libraries, and system settings. As a result of the complex interdependent nature of many applications, in some instances some applications cannot coexist on a single system with other applications (such as other versions of the software) while at the same time may require certain other applications to be previously installed on the platform. For example, many applications such as Microsoft Internet Explorer do not allow multiple versions of a particular package to be installed on the same platform. Furthermore, two different applications may require different versions of a shared file. The possibility of overwriting of an existing file when installing an application could cause a previously installed application that relies on the overwritten file to break. Likewise, there are many applications that require the presence of a secondary installation package to run. For example, any application that uses Microsoft's .NET framework or Sun Microsystem's Java runtime engine first requires installation of Microsoft .NET or Java, respectively.

To solve these and other problems, it has been known to "virtualize" a single application or a group of applications, thereby isolating these applications from one another and from system software, i.e., the operating system. By providing a thin software layer logically interposed between the operating system and the application, a virtualized application can execute without installing any files or modifying the system directory or system settings. During execution, queries for any file or registry setting are redirected to a "sandbox." If the file or registry setting is not present in the sandbox, then the query is directed through normal OS application programming interfaces (APIs).

Application virtualization successfully isolates an application from the remainder of the system and allows for enhanced security and policy enforcement, which are features desirable in enterprise environments. However, application virtualization requires that files and settings on which the application depends must either be present on the host platform or be present within the virtualized application package. Therefore, if a program for example requires the Java runtime library to operate, the entire Java runtime library must either be installed on the host platform or be present in the virtualized application package.

SUMMARY

A method for linking a plurality of virtualized application packages for execution on a computer system is described.

A runtime executable of a primary virtualized application package is launched. A secondary virtualized application package to be merged with the primary virtualized application package is identified. In one embodiment, application settings and file data for the first and second virtualized application packages are merged into a single data structure. An execution layer is created by starting execution of one of the application files associated with the primary virtualized application package. Requests from the execution layer to the operating system for configuration settings and contents of application files of either the primary virtualized application package or secondary virtualized application package and providing requested configuration settings are satisfied using configuration settings and file information from both the primary and secondary virtualized application packages.

DETAILED DESCRIPTION

Application virtualization involves logically interposing a thin management layer of software between an application and an operating system. All requests for reads and writes of nonvolatile (e.g., disk) storage and system settings made by the application are redirected to a sandbox containing files and settings that would be installed to the operating system, had the application been actually installed.

Figure 2:
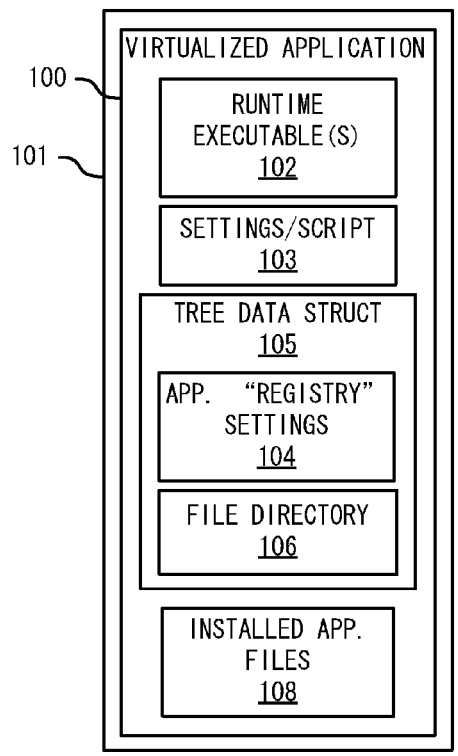
FIG. 2 shows one embodiment of a virtualized application.

FIG. 2 shows one embodiment of a virtualized application package which is suitable for use with the Microsoft Windows® OS. Virtualized application package 100 includes one or more runtime executables 102, configurations settings and/or a runtime script 103, a tree data structure 105 having application registry settings 104 and file directory 106, and installed application files 108. In this embodiment, all these components are packaged into a single container file 101, although other packaging arrangements are contemplated, such as, e.g., separate files for each of the listed components. The term, "package" is not meant to imply that the virtualized applications data files, and settings are required to all be contained in a single file, but instead is used to suggest that the virtualized application package can contain one or more application. For instance, a single virtualized application package may contain both a word processor and an unrelated Internet browser.

Runtime executable(s) 102 comprise one or more executable programs that implement the virtualization layer between the virtualized application package and the operating system. That is, the virtualization layer creates the sandbox and redirects reads and writes to and from the nonvolatile storage and the system registry. Although the present example is directed for use with the Microsoft Windows® operating system, which includes the concept of a "registry," it is contemplated that the tree data structure may be adapted or replaced with a different data structure for use with non-Microsoft operating systems as well.

File directory 106 is grafted to tree data structure 105 as a branch of tree structure 105 such that each node of the branch corresponds to a folder in file directory 106, and each terminal vertex, or "leaf" of the branch corresponds to a file. Terminal vertices of tree data structure 105 each contain an offset value (e.g., in bytes) identifying a start location of the corresponding file within container file 101, as well as the length, also in bytes, of the file. Therefore, each file packaged into container file 101 of the virtualized application package can be located by traversing file directory 106 to identify the offset and length, and therefore the location, of the corresponding file.

Configuration settings and/or runtime script 103 is a feature of the virtualized application package 100 that allows an administrator, i.e., a person creating or deploying virtualized application package 100, to alter the behavior and/or impose restrictions on the use of virtualized application package 100. These restrictions may, for example, be used to enforce security policies, access restrictions, or licensing limitations. In one embodiment, configurations settings and/or runtime script 103 (or runtime parameter) may be used to cause runtime executable 102 to load a secondary application and merge namespaces, as will now be further described in detail.

Figure 1:
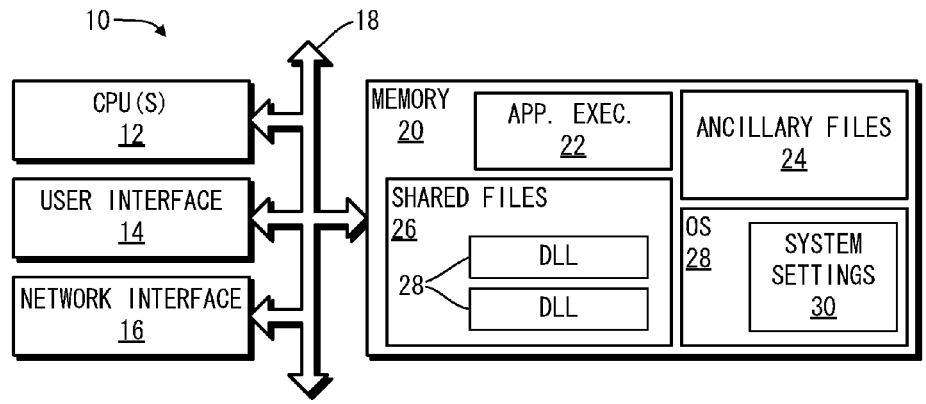
FIG. 1 shows an exemplary computer system having an application installed thereon in the known manner.
Figure 3:
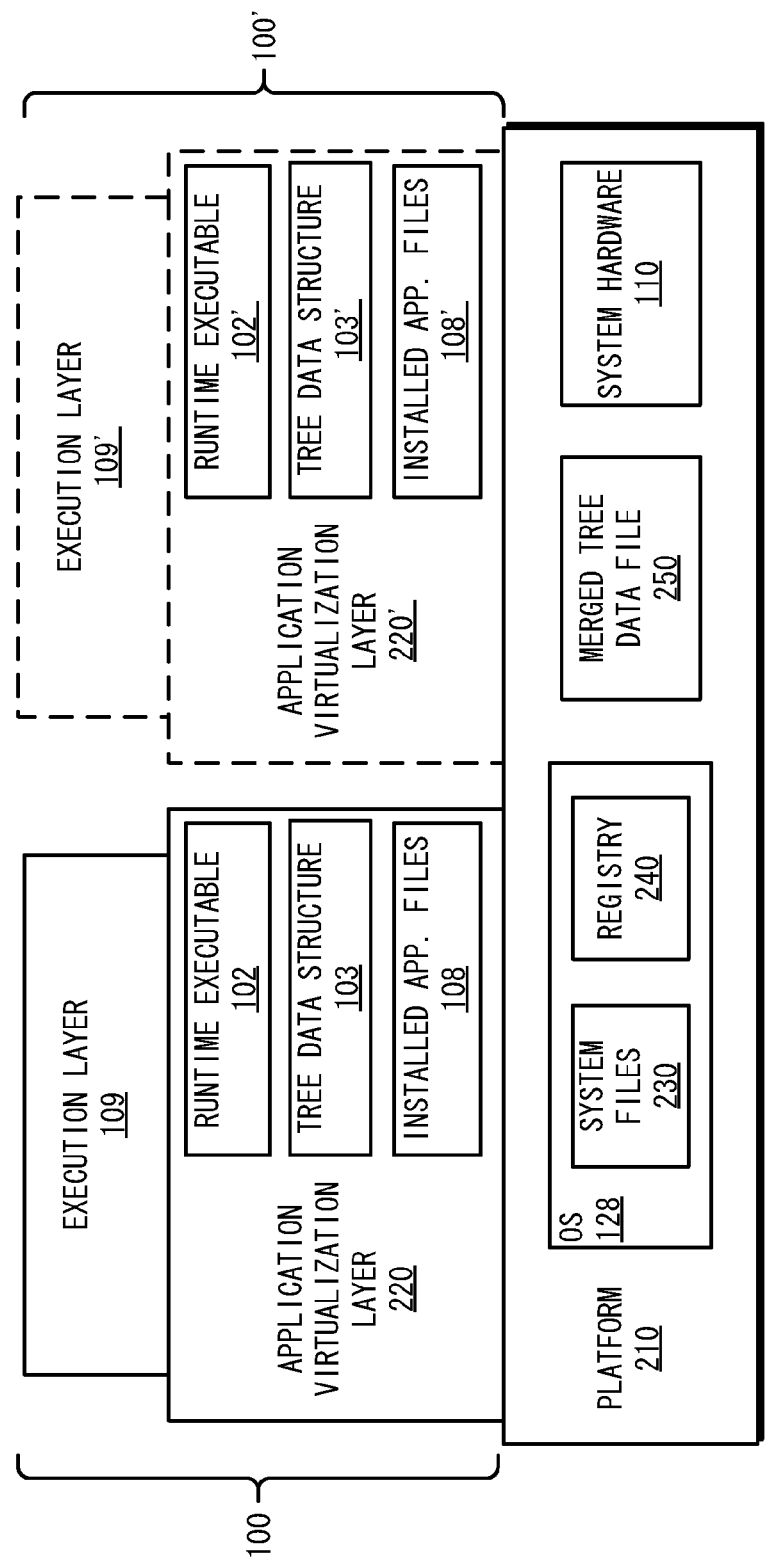
FIG. 3 shows a logical view of a platform hosting two virtualized application packages.

FIG. 3 shows a logical view of a platform 210 capable of hosting two virtualized application packages 100 and 100'. Platform 210 includes system hardware 110, as well as operating system 128, which includes system files 230 and registry 240. In one embodiment, system hardware 100 is physical system hardware, e.g., as described above with reference to FIG. 1, but of course it is also possible that system hardware 110 comprise a virtualized computer system, which maps virtual hardware to a physical host.

Virtualized application packages 100, 100' comprise execution layer 109, 109' and application virtualization layer 220, 220'. Execution layers 109, 109' comprise an execution threads having program instructions for carrying out the purpose of the respective application. The program instructions are obtained from corresponding installed application files 108, 108'. For example, the application "Mozilla Firefox," includes an executable file named "firefox.exe", which is included among other installed application files 108. In the logical view represented in FIG. 3, however, once "firefox.exe" is launched by runtime executable 102, one or more threads are launched that drive the operation of the system, with application virtualization layer 220 providing an isolating layer between execution layer 109 and platform 210.

It should be noted here that not every virtualized application requires an execution layer 109. As mentioned above, the term, "application" should be construed broadly to include any collection of files and/or settings. For example, the package Microsoft DirectX® can be installed separately and essentially comprises a collection of APIs that provides enhanced graphical and sound capabilities to other applications. Even if DirectX® contained no directly executable file, it would be still considered an application for present purposes since it is capable of being virtualized as a virtualized application.

Since application virtualization layer 220 isolates execution of execution layer 109, and likewise application virtualization layer 220' isolates execution of execution layer 109', each virtualized application package is ordinarily prohibited from accessing registry settings of the other virtualized application package. Specifically, execution layer 109 ordinarily cannot access registry settings stored in tree data structure 103' or access installed application files 108', and execution layer 109' ordinarily cannot access registry settings stored in tree data structure 103 or access installed application files 108. To overcome this restriction, virtualized application package 100' is, in a manner of speaking, "merged" into virtualized application package 100, and therefore does not execute as an independent virtualized application, as suggested by the use of dashed lines illustrating virtualized application 100' in FIG. 3. By "merged-in" it is meant that all the files and settings associated with virtualized application package 100' are available to virtualized application package 100.

Previously, to enable access by execution layer 109 to settings and files of a different application, the settings and files would be bundled into the virtualized application package 100 during the packaging, or "virtualization" of the application. However, in one embodiment, an enhancement to the application virtualization paradigm allows for a merged tree data file 250 to be created in platform 210 at runtime. The merged tree data file 250 provides a "gateway" to files and settings of one or more merged-in secondary virtualized application packages 100'. Upon launch of runtime executable 102, an inspection is made of internal virtualized application settings or a runtime embedded script is executed which may identify one or more secondary "merge-in" applications. Runtime executable 102, then accesses the container file for each merge-in application 100' and reads the tree data structure 103'. The tree data structure 103' is merged into the tree data structure 103 of the executing virtualized application package 100 to create a merged tree data structure, which is then stored as merged tree data file 250, either locally in the memory system of system hardware 110, or remotely, e.g., on a network shared drive.

During the merge, sufficient information is added to the merged tree data structure so that runtime executable 102 can locate a requested file in either installed application files 108 or any merged-in application files 108'. Further details are provided below with reference to FIGS. 4-6. It should be noted that a merged tree data structure is one method of combining data; however data structures other than tree-data structures may be similarly used.

Figure 4:
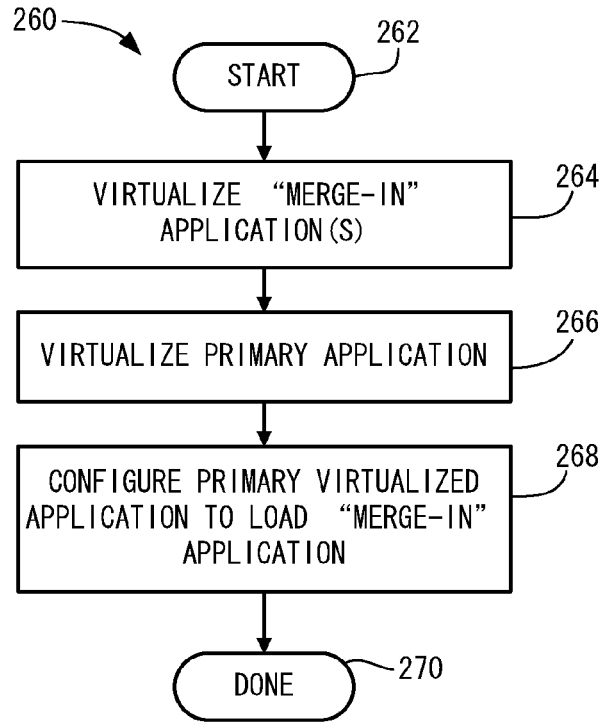
FIG. 4 shows a flowchart representing an exemplary procedure for virtualizing a primary application and separately virtualizing a secondary or "merge-in" application.

FIG. 4 shows a flowchart 260 representing an exemplary procedure for virtualizing a primary application and separately virtualizing a secondary or "merge-in" application. The "primary application" will generally be dependent upon the secondary or "merge-in" application such that to execute properly or to enhance execution (e.g., in the case of a plug-in component), the secondary "merge-in" application is normally required to be installed. It is also possible to have cross-dependency, wherein either application requires or is enhanced by the installation of the other, but for sake of clarity, the applications to be virtualized are described herein as "primary" and "merge-in."

The procedure begins as indicated by start block 262 and proceeds to operation 264, wherein the "merge-in" application is first virtualized. Various procedures for virtualizing an application are well known to those skilled in the art of application virtualization. In one embodiment, a clean environment is created, e.g., by starting with a system having a new, formatted disk and installing an operating system on it. Of course, the newly installed operating system may be installed on a virtual computer system rather than a physical computer system using system virtualization software in the well known manner. A snapshot of the clean install is created to store a state of the disk and registry settings prior to the installation of the application to be virtualized. Next, the application to be virtualized is installed using the installation package distributed with the software so that the installation proceeds in an ordinary manner directly on to the system. After installation of the application is complete, a second snapshot is created, and the two snapshots are compared. Each registry setting and file present in the second snapshot that is not present in the first snapshot is packaged into the virtualized application package, along with the runtime executable 102 (FIG. 2). More than one merge-in application may be virtualized at this time, each created using the same technique of comparing before and after snapshots.

With the installation of the one or more merge-in applications still present on the system, the procedure in FIG. 4 flows to operation 266, wherein the primary application is virtualized. The installation software distributed with the primary application may recognize the presence of the merge-in application already on the system, thereby avoiding halting installation of the primary application due to the absence of a required merge-in application. This is a common scenario, e.g., for Java, .NET, and other applications, such as with browser plug-ins. Thus, the order that the applications are virtualized may be dictated by the dependencies of the applications, and the desire to virtualize the dependant applications separately. In one embodiment, the merge-in application is virtualized in the same manner as the primary application, e.g., by taking before and after snapshots, and identifying the differences between the two. Optionally, after the primary application is virtualized, the system may be restored to the clean state using the initial snapshot created in operation 264 to effectively "undo" the installation, whereupon the virtualized application package may be used instead of the installed application.

The procedure flows to operation 268 after the primary application is virtualized. In operation 268, the primary virtualized application package is configured to merge-in the identified one or more virtualized merge-in applications when the runtime executable is launched, after which the procedure concludes as indicated by done block 270.

Referring again to FIG. 2, settings/script 103 may be modified by an administrator to cause runtime executable 102 to create a merged tree data file 250 (FIG. 3), containing settings and file information of the primary virtualized application package and each merged-in virtualized application package.

In one embodiment, registry settings are merged to form a common tree structure containing all the keys and values contained in each of the merged virtualized application packages. File directory and file information are likewise merged. However, added to each terminal vertex of the tree data structure that contains the location of the corresponding file is an identifier of the container file that contains the file as will now be described with reference to FIG. 5.

Figure 5:
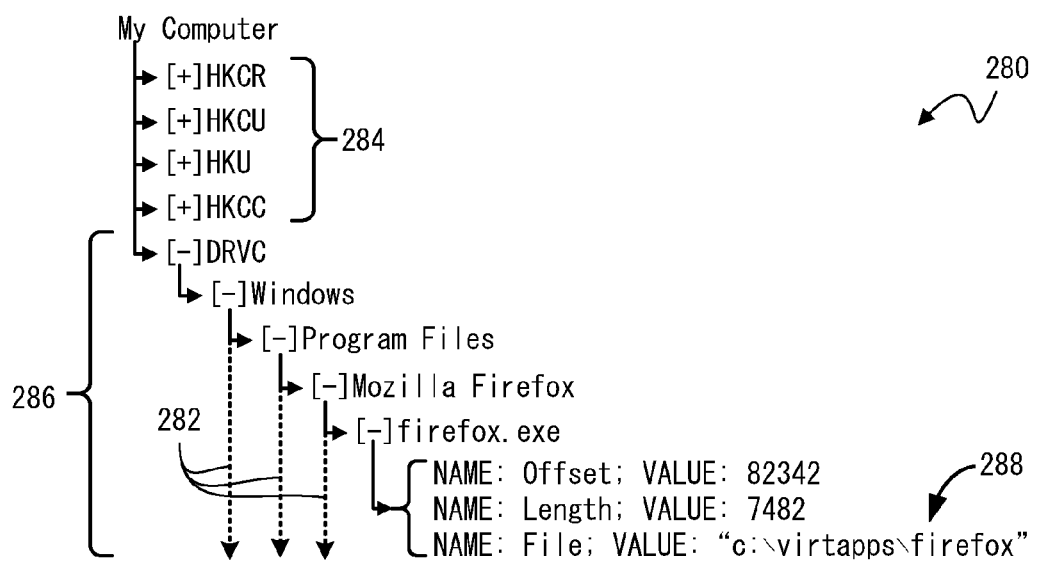
FIG. 5 illustrates an exemplary merged tree data structure for the purpose of illustrating the augmenting of merged data structure.

FIG. 5 illustrates an exemplary merged tree data structure 280 for the purpose of illustrating the augmenting of merged data structure 280. In this example, merged tree data structure 280 includes merged windows registry settings 284, which correspond to registry settings added or modified by the installation of the primary and merge-in applications. The plus signs ("[+]") indicate that the branches for respective nodes are collapsed and therefore not visible in FIG. 5. Merged tree data structure 280 also includes file directory 286 which reflects a directory structure and location of each file installed by the primary and merge-in applications, and captured in the virtualization process. An initial node "DRVC" represents a root folder, i.e., "c:\" in a Microsoft Windows system. Any arbitrary identifier may of course be used to identify a root folder, depending on the implementation of the application virtualization system.

Branching from node DRVC are additional nodes, each representing subdirectories in the file system that were created or modified in the course of installing either the primary or merge-in applications. Arrows 282 indicate that only a subset of each expanded node is shown. In the example of FIG. 5, one of the virtualized application packages includes the file "firefox.exe" which has a corresponding path of "c:\Windows\Program Files\Mozilla Firefox\". The terminal vertex corresponding to the file, "firefox.exe" includes a plurality of "names" and corresponding "values" in the same manner as keys within the system registry for Microsoft Windows®. In this case, "firefox.exe" has an offset value of 82342 and a length of 7482. The offset and length values identify the location of "firefox.exe" within a source container file. However, because the merged tree data structure includes data for multiple virtualized application packages, an identifier for the source container file identifier is added to merged tree data structure 280. In other words, the merged tree data structure is augmented during the merge to include an identifier of the source container file for each file installed during the application virtualization process (i.e., operations 264 and 266 in FIG. 4).

In the embodiment shown in FIG. 5, the location and name of the source container file is identified by the string value "c:\virtapps\firefox". However, is it is also contemplated that a default location may be defined within the settings 103 (FIG. 1) of the primary virtualized application package, so that the location of all mergable virtualized application packages are known in advance. In this case, only the file name of the source container file is required.

Figure 6:
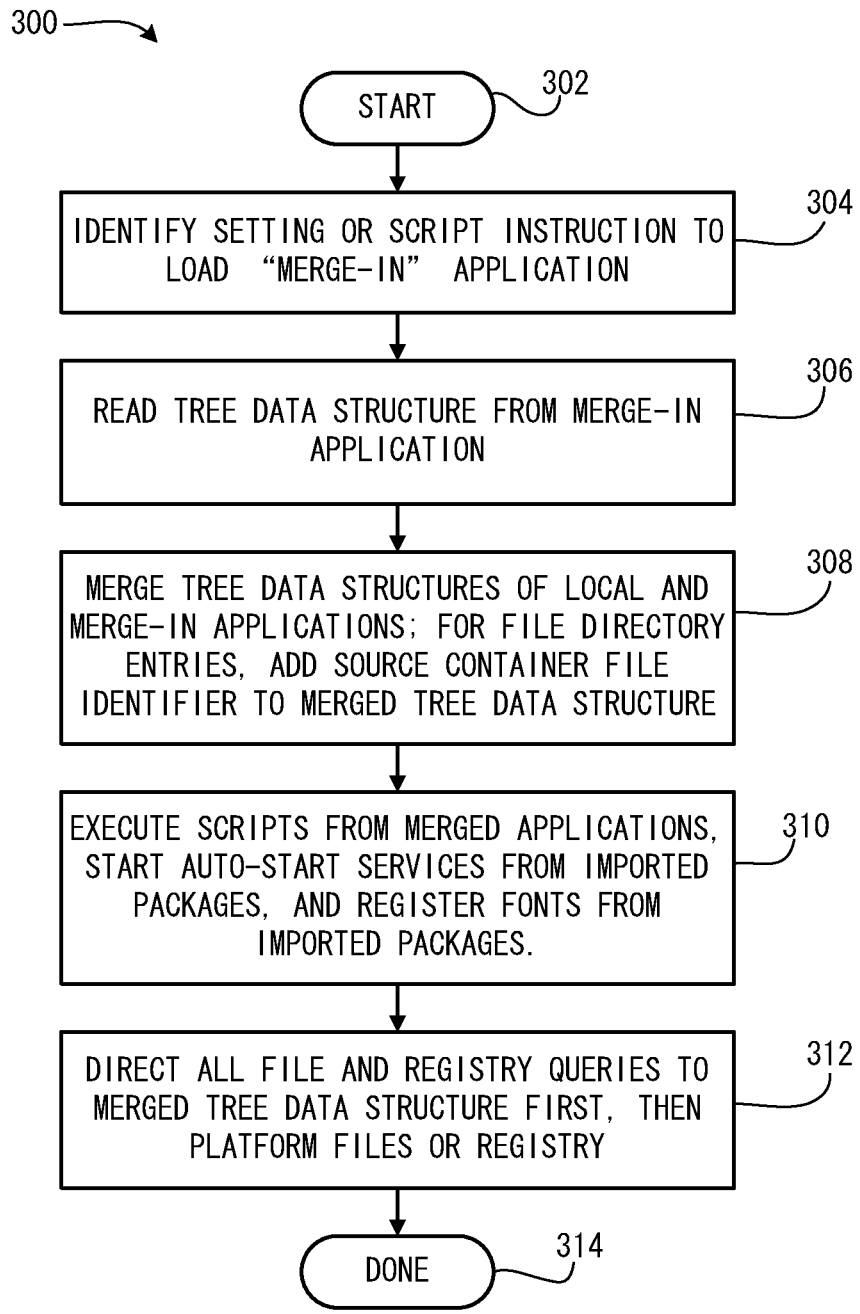
FIG. 6 shows a flowchart depicting an exemplary procedure that may be carried out by runtime executable to link multiple virtualized application packages.

FIG. 6 shows a flowchart 300 depicting an exemplary procedure that may be carried out by runtime executable 102 to link multiple virtualized application packages. The procedure begins as indicated by start block 302 and flows to operation 304 wherein a setting or script instruction is identified that launches the linking procedure. In one embodiment, a plurality of settings are embedded into container file 101 (FIG. 2). When runtime executable 102 is launched, the settings are analyzed. If a setting is encountered that designates a virtualized application package to be merged, then the merge routine is launched. For example, suppose an Internet Browser plugin is virtualized into a container file "plugin.exe". Then, in one embodiment, a configuration setting causing "plugin.exe" to be merged with the current virtualized application package may be something like, "RequiredAppLinks=Plugin.exe". In addition to configuration settings, in one embodiment, a script, such as a Visual Basic script, may be executed upon launch of runtime executable 102. By allowing the administrator to create a script, the selection as to which, if any, merge-in applications are merged may be determined based a state of the user's machine, or other system variables at the time the virtualized application package is launched. It is also possible to provide a runtime parameter that identifies one or more applications to be linked.

Returning to FIG. 6, once a setting or script instruction to load a merge-in application is identified, the procedure flows to operation 306, wherein the tree data structure from the merge-in application is accessed and read. Next in procedure 308, tree data structures of local and merge-in virtualized application packages are merged to form a single tree data structure. As explained above with reference to FIG. 5, the merged tree data structure is augmented with source container file identifiers for each file identified by the merged tree data structure.

In one embodiment, should multiple applications be merged into the primary application, an algorithm is selected to determine, in the case of a collision, which registry or file data will be used. For example, if virtualized application package A and virtualized application package B each include a file "c:\foo.txt" a selection algorithm is employed to identify which copy of c:\foo.txt is included in the merged data tree since there can be only one copy. In one embodiment, a "last import wins" algorithm is employed, such that whatever order the merge-in virtualized applications are listed in settings/script 103 (FIG. 2), the last one to be imported will overwrite any data supplied by previously imported virtualized applications. Other algorithms are also contemplated, such as alphabetical order, or order by priority, in which case a priority value is supplied along with the identifier for the merge-in application, either in the settings for the primary virtualized application package or in the settings for the merge-in applications.

The merged tree data exemplified in FIG. 5 is written to a merged tree data file 250 (FIG. 3) in a predetermined or designated location in the memory of the local computer system or some other accessible storage device. Then the procedure flows to operation 310 wherein scripts from merged-in virtualized application packages are executed, auto-start services from merged-in virtualized application packages are launched, and fonts from merged-in virtualized application packages are registered with the operating system. In one embodiment, if two imported applications have scripts with the same name, only one of the script is executed based on a priority algorithm, substantially as described above with respect to registry and file data. Where multiple scripts are provided having different names, the order of execution may be selected based on an order-selection algorithm. In one embodiment, the order-selection algorithm executes the scripts in alphabetical order. In another embodiment, the order-selection algorithm executes the scripts in the same order that the packages are loaded. In yet another embodiment, the order-selection algorithm executes the scripts in order of priority, as determined by a priority value corresponding to each script. Auto-start services are processes that are configured to be automatically launched upon startup of a computer system or virtualized application. Application virtualization layer 220 also manages fonts that are associated with virtualized applications to ensure that the operating system properly renders text and symbols utilized by the virtualized application.

After operation 310 completes, the procedure flows to operation 312, wherein during execution of the application in execution layer 109 (FIG. 3), queries for file and registry entries directed merged tree data structure first. If the requested registry setting or file is not present, then the query is directed to normal platform APIs to find the corresponding files or registry. Any modification of system files or registry settings are made to the merged tree data structure and files contained in the corresponding container file, with predefined exceptions. For example, if a user uses a word processing program to create a file in a folder designated for that purpose, e.g., a "My Documents" folder, then application virtualization layer 220 may be configured to allow that file to be stored as an ordinary data file on the user's disk. The portions of a user's disk that the application virtualization layer may permit to be written to may be selected by an administrator using the settings and/or script 103 (FIG. 2).

Operation 312 continues until the application runtime exits, whereupon the procedure concludes as indicated by done block 314.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for linking a plurality of virtualized application packages for execution on a computer system, each virtualized application package comprising configuration settings and file data, the file data comprising contents of a plurality of application files and mapping information for each of the plurality of application files, the mapping information associating a file path of each of the plurality of application files to an actual location of the contents of a corresponding application file of the plurality of application files, the file path identifying a virtual location of the corresponding application files in a logical structure of a hierarchical disk directory, the virtual location being a location that the application file would be copied to, had the virtualized application package been directly installed on the computer system, the method comprising:

identifying a primary application package installed on the computer system;

determining that the primary application package is dependent on a secondary application package for execution;

prior to virtualizing the primary application package, determining whether a virtualized secondary application package is accessible, wherein the virtualized secondary application package includes a first application virtualization layer;

in response to determining that the secondary virtualized application package is accessible, virtualizing the primary application package, wherein the primary virtualized application package includes a second application virtualization layer that is isolated from the first application virtualization layer;

configuring the primary virtualized application package to merge-in the virtualized secondary application package when a runtime executable is launched, wherein the merge-in provides a gateway from the primary virtualized application package to the virtualized secondary application package;

launching a runtime executable for the primary virtualized application package;

launching an execution layer by starting execution of one of the application files associated with the primary virtualized application package;

intercepting requests from the execution layer to an operating system for configuration settings of either the primary virtualized application package or the secondary virtualized application package;

providing requested configuration settings using the configuration settings from a corresponding one of the primary virtualized application package and the secondary virtualized application packages;

intercepting file operations from the execution layer to the operating system for one of the application files of either the primary virtualized application package or the secondary virtualized application package; and using the mapping information from the primary virtualized application package and the mapping information from the secondary virtualized application package to identify a location of contents of one file to satisfy the file operations.

2. The method of claim 1, wherein the primary virtualized application package and the secondary virtualized application packages each comprise a single file containing the plurality of application files, and wherein the mapping includes, for each of the application files, an offset and length of the application file, the offset being a position within the single file of the contents of the application file.

3. The method of claim 1, wherein the configuration settings are stored in a hierarchical data tree structure, the method further comprising:

prior to the launching of the execution layer, merging the configuration settings of the primary virtualized application package and the configuration settings of the secondary virtualized application package to create a merged data tree structure containing configuration settings from both the primary virtualized application package and the secondary virtualized application package; and wherein the providing of the requested configuration settings comprises accessing the merged data tree structure to satisfy the request.

4. The method of claim 1, further comprising:

prior to the launching of the execution layer, creating a single data structure formed from the mapping information for the primary virtualized application package and the mapping information for the secondary virtualized application package, wherein the using of the mapping information to satisfy intercepted disk I/O requests comprises accessing the single data structure to identify the location of the contents of the one file.

5. The method of claim 4, wherein the single data structure is a tree data structure, wherein each branch of the tree data structure corresponds to a folder in the hierarchical disk directory, and each leaf of the tree data structure corresponds to one of the application files.

6. The method of claim 5, wherein the configuration settings are stored in a hierarchical data tree structure, the method further comprising:

prior to the launching of the execution layer, merging the configuration settings of the primary virtualized application package and the configuration settings of the secondary virtualized application package to create a merged data tree structure containing configuration settings from both the primary virtualized application package and the secondary virtualized application package; and grafting the single data structure to the merged data tree structure to create a single merged data tree.

7. The method of claim 1, wherein each of the plurality of virtualized application packages comprise a single file containing the runtime executable, the configuration settings, and the file data.

8. The method of claim 1, wherein the secondary virtualized application package includes a run-time library required by the primary virtualized application package for execution.

9. The method of claim 1, wherein the secondary virtualized application package includes a plug-in usable by the primary virtualized application package.

10. The method of claim 1, wherein the virtualization layer is implemented by the runtime executable.

11. The method of claim 1, wherein, for each of the virtualized application packages, configuration settings and file data are obtained by comparing snapshots of a file system and the operating system configuration settings of the computer system before and after actual installation of a corresponding application package to the computer system.

12. A machine readable storage medium embodying computer program instructions for linking a plurality of virtualized application packages for execution on a computer system each virtualized application package comprising configuration settings and file data, the file data comprising contents of a plurality of application files and mapping information for each of the plurality of application files, the mapping information associating a file path of each of the plurality of application files to an actual location of the contents of a corresponding application file of the plurality of application files, the file path identifying a virtual location of the corresponding application files in a logical structure of a hierarchical disk directory, the virtual location being a location that the application file would be copied to, had the application files encapsulated by the virtualized application package been directly installed on the computer system, the computer program instructions causing the computer system to implement a method, the method comprising:

identifying a primary application package installed on the computer system;

determining that the primary application package is dependent on a secondary application package for execution;

prior to virtualizing the primary application package, determining whether a virtualized secondary application package is accessible, wherein the virtualized secondary application package includes a first application virtualization layer;

in response to determining that the secondary virtualized application package is accessible, virtualizing the primary application package, wherein the primary virtualized application package includes a second application virtualization layer that is isolated from the first application virtualization layer;

configuring the primary virtualized application package to merge-in the virtualized secondary application package when a runtime executable is launched, wherein the merge-in provides a gateway from the primary virtualized application package to the virtualized secondary application package;

launching an execution layer by starting execution of one of the application files associated with the primary virtualized application package;

intercepting requests from the execution layer to an operating system for configuration settings of each the primary virtualized application package or the secondary virtualized application package;

providing requested configuration settings using the configuration settings from a corresponding one of the primary virtualized application package and the secondary virtualized application package;

intercepting disk in/out (I/O) requests from the execution layer to the operating system for one of the application files of either the primary virtualized application package or the secondary virtualized application package; and using the mapping information from the primary virtualized application package and the mapping information from the secondary virtualized application package to identify a location of contents of the one application file to satisfy the disk I/O request.

13. The machine readable storage medium of claim 12, wherein the primary virtualized application package and the secondary virtualized application package each comprise a single file containing the plurality of application files, and wherein the mapping includes, for each of the application files, an offset and length of the application file, the offset being a position within the single file of the contents of the application file.

14. The machine readable storage medium of claim 12, wherein the configuration settings are stored in a hierarchical data tree structure, the method further comprising:

prior to the launching of the execution layer, merging the configuration settings of the primary virtualized application package and the configuration settings of the secondary virtualized application package to create a merged data tree structure containing configuration settings from both the primary virtualized application package and the secondary virtualized application package; and wherein the providing of the requested configuration settings comprises accessing the merged data tree structure to satisfy the request.

15. The machine readable storage medium of claim 12, wherein the method further comprises:

prior to the launching of the execution layer, creating a single data structure formed from the mapping information for the primary virtualized application package and the mapping information for the secondary virtualized application package, wherein the using of the mapping information to satisfy intercepted disk I/O requests comprises accessing the single data structure to identify the location of the contents of the one file.

16. The machine readable storage medium of claim 15, wherein the single data structure is a tree data structure, wherein each branch of the tree data structure corresponds to a folder in the hierarchical disk directory, and each leaf of the tree data structure corresponds to one of the application files.

17. The machine readable storage medium of claim 16, wherein the configuration settings are stored in a hierarchical data tree structure, the method further comprising:

prior to the launching of the execution layer, merging the configuration settings of the primary virtualized application package and the configuration settings of the secondary virtualized application package to create a merged data tree structure containing configuration settings from both the primary virtualized application package and the secondary virtualized application package; and grafting the single data structure to the merged data tree structure to create a single merged data tree.

18. The machine readable storage medium of claim 12, wherein each of the plurality of virtualized application packages comprise a single file containing the computer program instructions, the configuration settings, and the file data.

19. The machine readable storage medium of claim 12, wherein the secondary virtualized application package includes a run-time library required by the primary virtualized application package for execution.

20. The machine readable storage medium of claim 12, wherein the secondary virtualized application package includes a plug-in usable by the primary virtualized application.

21. The machine readable storage medium of claim 12, wherein the virtualization layer is implemented by the computer program instructions.

22. The machine readable storage medium of claim 12, wherein, for each of the plurality of virtualized application packages, configuration settings and file data are obtained by comparing snapshots of a file system and the operating system configuration settings of the computer system before and after actual installation of a corresponding application to a computer system.

23. A method for linking a plurality of virtualized application packages for execution on a computer system, each virtualized application package comprising configuration settings and file data, the file data comprising contents of a plurality of application files and mapping information for each of the plurality of application files, the mapping information associating a file path of each of the plurality of application files to an actual location of the contents of a corresponding application file of the plurality of application files, the file path identifying a virtual location of the corresponding application files in a logical structure of a hierarchical disk directory, the virtual location being a location that the application file would be copied to, had the virtualized application package been directly installed on the computer system, the method comprising:

identifying a primary application package installed on the computer system;

determining that the primary application package is dependent on a secondary application package for execution;

prior to virtualizing the primary application package, determining whether a virtualized secondary application package is accessible, wherein the virtualized secondary application package includes a first application virtualization layer;

in response to determining that the secondary virtualized application package is accessible, virtualizing the primary application package, wherein the primary virtualized application package includes a second application virtualization layer that is isolated from the first application virtualization layer;

configuring the primary virtualized application package to merge-in the virtualized secondary application package when a runtime executable is launched, wherein the merge-in provides a gateway from the primary virtualized application package to the virtualized secondary application package;

launching a runtime executable for the primary virtualized application package, the primary virtualized application package being one of the plurality of virtualized application packages;

merging configuration settings and file data for the primary virtualized application package and configuration settings and file data for the secondary virtualized application package to create a merged data tree structure containing configuration settings and file data from both the primary virtualized application package and the secondary virtualized application package;

launching an execution layer by starting execution of one of the application files associated with the primary virtualized application package;

intercepting requests from the execution layer to an operating system for configuration settings of either the primary virtualized application package or the secondary virtualized application package;

accessing the merged data tree structure for the requested configuration settings;

intercepting file operations from the execution layer to the operating system for one of the application files of either the primary virtualized application package or the secondary virtualized application package; and accessing the merged data tree structure for mapping information in the file data from the primary virtualized application package and for mapping information in the file data from the secondary virtualized application package to identify a location of contents of a file to satisfy the file operations.

* * * * *